(12) United States Patent
Carpenter et al.

(10) Patent No.: US 7,017,044 B1
(45) Date of Patent: Mar. 21, 2006

(54) EXTREMELY SECURE METHOD FOR KEYING STORED CONTENTS TO A SPECIFIC STORAGE DEVICE

(75) Inventors: Christopher M. Carpenter, Sunnyvale, CA (US); Todd Peter Carpenter, St. Paul, MN (US); John Masles, San Jose, CA (US); Chris Paul Dudte, Reno, NV (US)

(73) Assignee: Maxtor Corporation, Longmont, CO (US)

( * ) Notice: Subject to any disclaimer, the term of this patent is extended or adjusted under 35 U.S.C. 154(b) by 809 days.

(21) Appl. No.: 09/631,270

(22) Filed: Aug. 2, 2000

(51) Int. Cl.
*H04L 9/00* (2006.01)

(52) U.S. Cl. .................. 713/176; 713/187; 713/189; 713/193; 705/57

(58) Field of Classification Search ............... 713/187, 713/189, 191, 193, 165, 176; 705/57–58; 380/203
See application file for complete search history.

(56) References Cited

U.S. PATENT DOCUMENTS

| | | | |
|---|---|---|---|
| 4,746,998 A * | 5/1988 | Robinson et al. ........... 360/72.1 |
| 5,113,518 A * | 5/1992 | Durst, Jr. et al. ........... 713/200 |
| 5,412,718 A * | 5/1995 | Narasimhalu et al. ........ 705/51 |
| 5,805,699 A * | 9/1998 | Akiyama et al. ............ 705/58 |
| 5,920,628 A * | 7/1999 | Indeck et al. ................ 360/25 |
| 6,076,165 A * | 6/2000 | Maenza ....................... 713/200 |
| 6,148,407 A * | 11/2000 | Aucsmith .................... 713/202 |
| 6,473,861 B1 * | 10/2002 | Stokes ......................... 713/193 |
| 6,560,176 B1 * | 5/2003 | Heylen ....................... 369/53.1 |
| 6,684,199 B1 * | 1/2004 | Stebbings .................... 705/57 |
| 6,782,458 B1 * | 8/2004 | Noble ......................... 711/163 |
| 2002/0010864 A1 * | 1/2002 | Safa ........................... 713/200 |

OTHER PUBLICATIONS

Bruce Schneier, Applied Cryptography, 1996, John Wiley and Sons, Inc., second edition, pp 220-222.*

* cited by examiner

*Primary Examiner*—Matthew Smithers
*Assistant Examiner*—Minh Dieu Nguyen
(74) *Attorney, Agent, or Firm*—David M. Sigmond (57) ABSTRACT

An extremely secure method for keying source contents to a source storage medium provided to prevent use of unauthorized copies at minimal cost. The host processor combines a unique, immutable and verifiable physical attribute of a hard disk drive, i.e., the drive's defect list, with the content to be secured to write a corresponding fingerprinted encrypted content on a source medium. When a local processor wants to use the sanctioned source content, the fingerprinted content is read from a local storage medium. The local processor then decrypts and separates the defect list out of the source content and reads the local storage medium defect list. If the decrypted defect list matches the local storage medium defect list, then the local processor recognizes the local sanctioned medium and continues processing the source contents. Otherwise, a non-matching defect list indicates an unauthorized copy from the source to the local storage medium.

95 Claims, 4 Drawing Sheets

EXTREMELY SECURE METHOD FOR KEYING STORED CONTENTS TO A SPECIFIC STORAGE DEVICE

FIELD OF INVENTION

Invention relates to securing data in a storage medium device, more particularly to methods of securing specific files in a storage medium device to prevent use of unauthorized copies of the specific files.

BACKGROUND OF INVENTION

The relatively open and known architecture of a typical hard disk drive (HDD) renders it fairly easy for determined and minimally-funded attackers to duplicate content stored on the HDD. Low-level block copy software is easily available and produces an unauthorized drive image copy of the stored HDD content that is indistinguishable from the authorized source HDD for many host applications. Preventing a determined attacker from copying a drive's image to another drive and then using that copy on another host is difficult. Standard content encryption methods typically disallow viewing of the copied encrypted content, but it does not securely prevent the use of that content on another host having a valid decryption or usage key.

Typically, hardware authorization keys have been used to identify an authorized host. These keys have an added hardware cost and have historically been broken and duplicated in as little as a few days. This approach does not normally differentiate between source and copied contents. Other approaches to protect against unauthorized copying and/or use of disk contents typically require adding hardware to the host and/or disk drive to provide a secured or keyed communication channel and encrypted or keyed contents on the HDD. This approach generally adds hardware cost to the host and/or HDD. Also, this solution is not always transportable across HDD vendors because they can require custom hardware. Moreover, copying encrypted contents to another H-DD does not explicitly prevent its use. Another typical prior approach is requiring the original authorized CD-ROM to be physically present in a CD drive during use of the software or data. However, copying the original CD-ROM is easy. Thus, there is a need for a method to secure specific files to prevent the use of an unauthorized copied file stored on a storage medium.

SUMMARY OF INVENTION

An extremely secure method for keying source contents to a source storage medium is provided to prevent use of unauthorized copies, where there is no significant added cost to the disk drive. The host processor can use a well characterized encryption algorithm such as DES and a hard disk drive's (HDD's) statistically unique, immutable and verifiable physical attribute, such as the defect list, servo or channel characteristics to write a unique signature, or fingerprint, on a source medium. Accordingly, the extremely secure method of this invention allows use of source content with other similar hosts, but correspondingly disabling all copies of the sanctioned drive in any host.

The host processor reads the source medium original defect list or other such relatively immutable physical attribute. It then merges a representation of the attribute and the content to be secured. The host processor then encrypts the resulting content with a well-characterized algorithm such as DES. When a host wants to use the sanctioned source contents, it reads the source content from the storage medium and decrypts it with a decryption key. The host then parses the defect list out of the source content and explicitly reads the local storage medium defect list. If the resulting decrypted defect list matches the local storage medium defect list, then the host recognizes the local medium contents as sanctioned and the host continues use and processing of the source contents. If there is no match, then the local medium content is determined to be an unauthorized copy of the source storage medium. The host then rejects the use of the contents.

DETAILED DESCRIPTION OF PREFERRED EMBODIMENT

During the manufacturing process, a hard disk drive (HDD) goes through a process of detecting media defects. These defects are represented by specific Physical Block Addresses (PBAs), collated and stored on the HDD in a structure called the "defect list," such as a "P-list," to insure that a host processor would never store user data in one of the defective PBAs. This list is immutable and does not change throughout the life of that drive. It is a physical, statistically unique, verifiable and relatively immutable (PSUVI) characteristic of that HDD. This list is an inherent physical signature that statistically differentiates each HDD from another.

Figure 1:
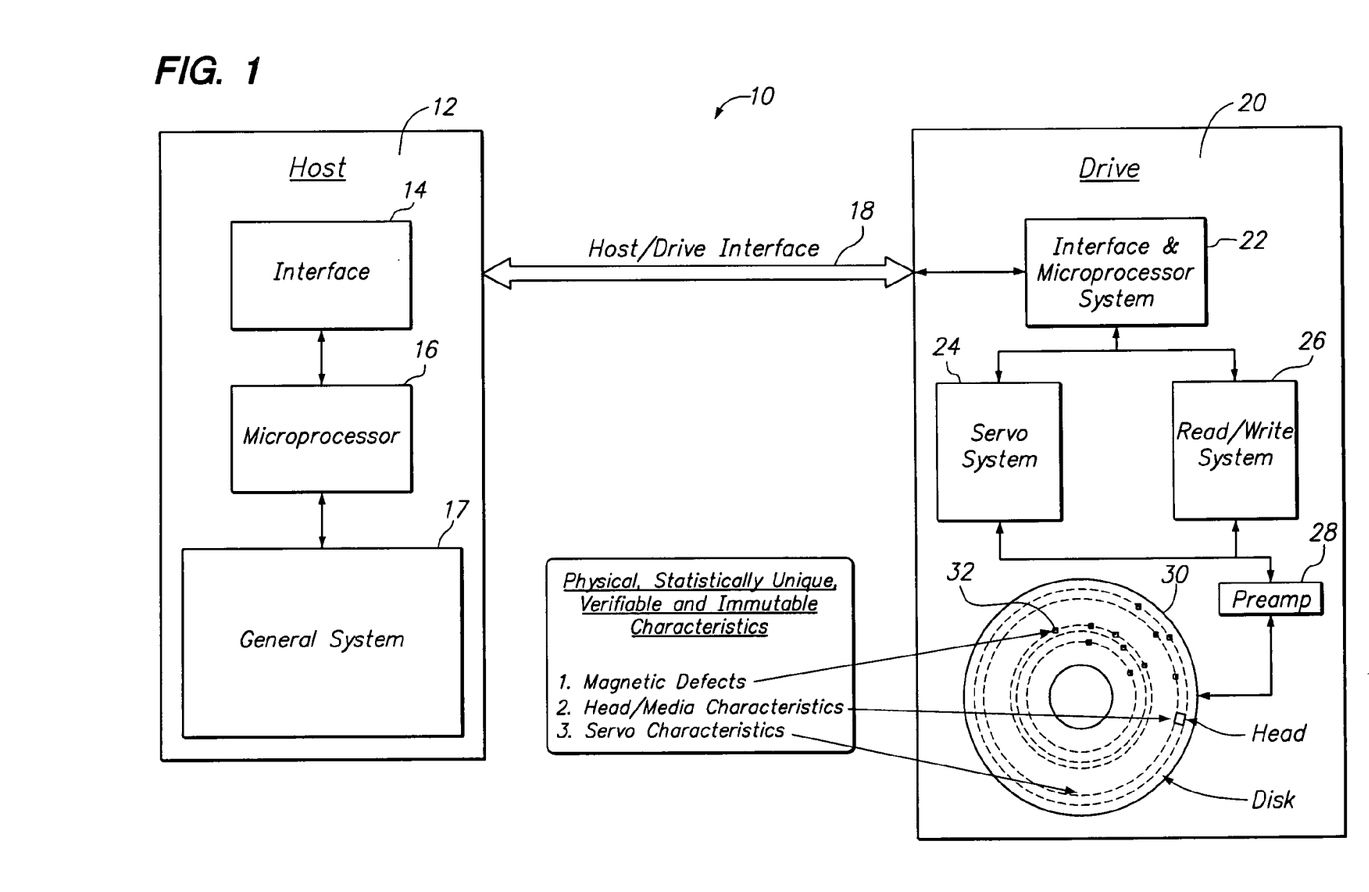
FIG. 1 is a generalized block diagram of an extremely secure system for keying stored contents to a storage medium in accordance with the principles of the present invention.

FIG. 1 illustrates a generalized system block diagram 10 of an extremely secure system for keying stored contents to a storage medium in accordance with the principles of the present invention. The extremely secure keying stored content system 10 comprises a host system 12 comprising a host interface 14 coupled to a host microprocessor 16, which is then coupled to other host system hardware generalized for simplicity here as general system 17. Host system 12 stores an extremely secure software application to be later described in further detail with reference to FIGS. 2–4. Extremely secure system 10 also comprises a disk drive unit 20 coupled to host unit 12 via a host-to-drive interface 18. Disk drive unit 20 comprises an interface and storage medium processor system 22, a servo system 24, a read/write system 26, a preamplifier 28, and one or more storage disks 30. Preamplifier 28 reads a PSUVI characteristic corresponding to, for example, "the defect list," or any other PSUVI characteristic associated with one or more storage disks 30. The read PSUVI characteristic is then used by host system 12 to encrypt a source content stored on the one or more storage disks 30.

Figure 2A:
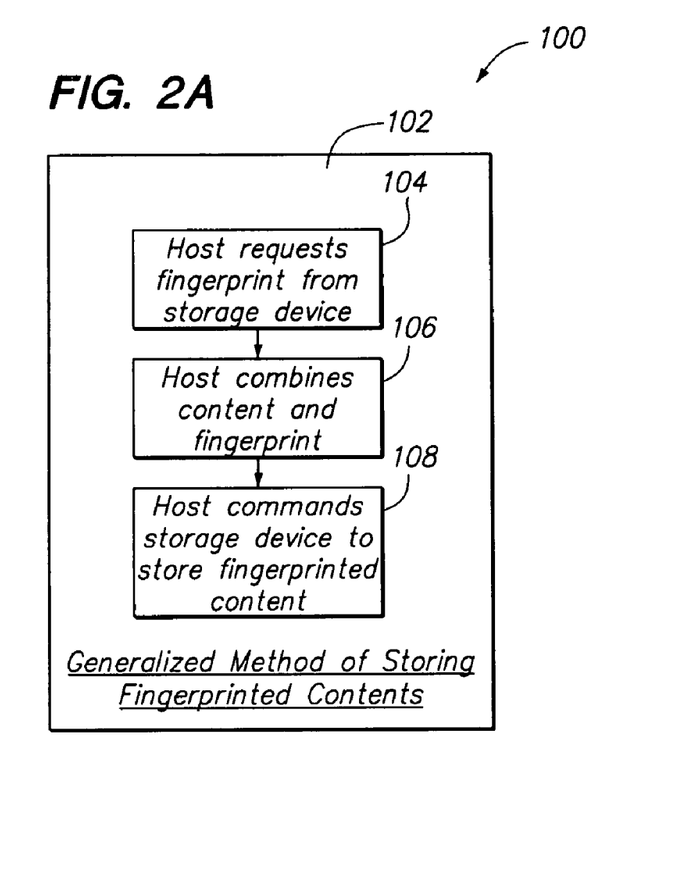
FIG. 2A shows a generalized flowchart of an extremely secure method for keying stored contents to the storage medium in accordance with the present invention.
Figure 2B:
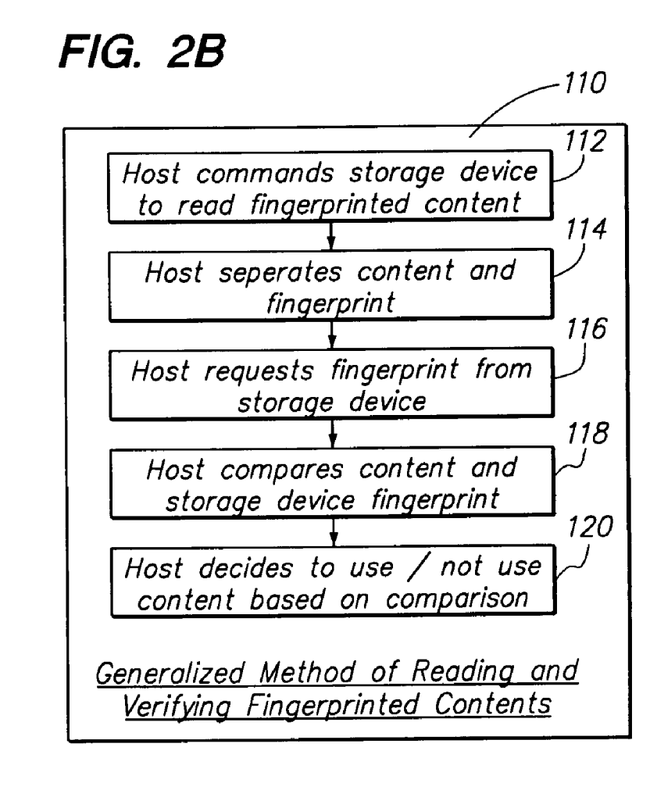
FIG. 2B shows a generalized flowchart of an extremely secure method for reading and verifying fingerprinted contents in a local storage medium in accordance with the present invention.

FIGS. 2A and 2B illustrate generalized flowcharts of extremely secured method 100 for keying stored contents to the storage medium (FIG. 2A) and for reading and verifying fingerprinted contents of stored information (FIG. 2B) in accordance with the present invention. In general as illustrated by this embodiment, in a first step 104 during a "storing fingerprinted contents" operation 102, a request is sent by host processor 16 to disk drive processor 22 to read a PSUVI characteristic, such as the defect list. During a second step 106, the read defect list is then combined with a specified file content to be secured to generate a fingerprinted content. In a step 146 (FIG. 3), the fingerprinted content can be encrypted first prior to storing. Then in step 108, host processor 16 then commands disk processor 22 to store the fingerprinted content on disk 30. During a "reading and verifying fingerprinted contents" operation 110, in step 112 the host processor 16 commands the disk drive processor 22 to read fingerprinted content. In step 114, host processor 16 separates content and fingerprint. Subsequently, host processor 16 requests fingerprint from disk drive processor 22 in step 116. Then in step 118, host processor 16 compares content and storage device fingerprint. In a last step 120, the host processor 16 decides to use or not to use content based on comparison in step 118.

Figure 3:
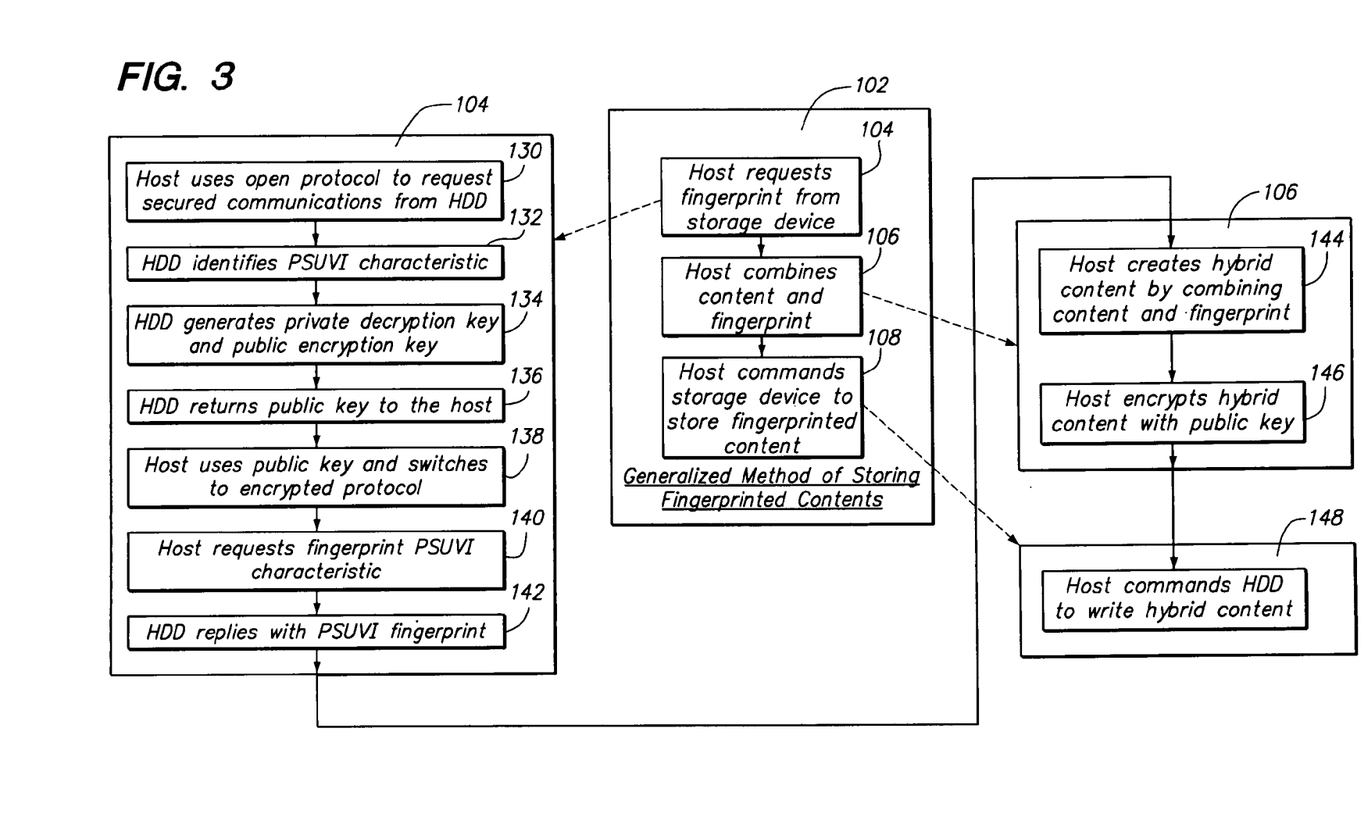
FIG. 3 shows a more expanded flowchart of the steps of storing fingerprinted contents of FIG. 2A.

FIG. 3 illustrates in greater detail a sample method of storing fingerprinted content 102. In this example, host processor 16 would execute steps wherein host processor 16 requests a fingerprint from a storage device 20, such as a defect list from storage device 20, follow by step 106 wherein host processor 16 combines content of a file to be secured with the retrieved fingerprint, and step 108 wherein host processor 16 commands storage device 20 to store fingerprinted content. As illustrated in more detail in FIG. 3, one embodiment to step 104 of requesting a fingerprint comprises:

1. Host 12 using open protocol to request secured communication from HDD 20 in step 130;
2. HDD 20 identifies a PSUVI characteristic, such as a defect list in step 132;
3. HDD 20 then generates a decryption key and encryption key in step 134;
4. HDD 20 then returns encryption key to host 126 in step 136;
5. Host 126 then uses encryption key and switches to encrypted protocol in step 138;
6. Host 126 then requests fingerprint PSUVI characteristic 140; and then
7. HDD 20 replies with PSUVI fingerprint in step 142.

As illustrated in more detail in FIG. 3, one embodiment to step 106 of combining content to be secured with the retrieved fingerprint comprises:

1. Host 12 creating a hybrid content by combining content and fingerprint in step 144; and
2. Host 12 encrypting hybrid content with public key in step 146.

Additionally, step 108 of storing fingerprinted content may comprise host 12 commanding HDD 20 to write hybrid content in step 148.

Figure 4:
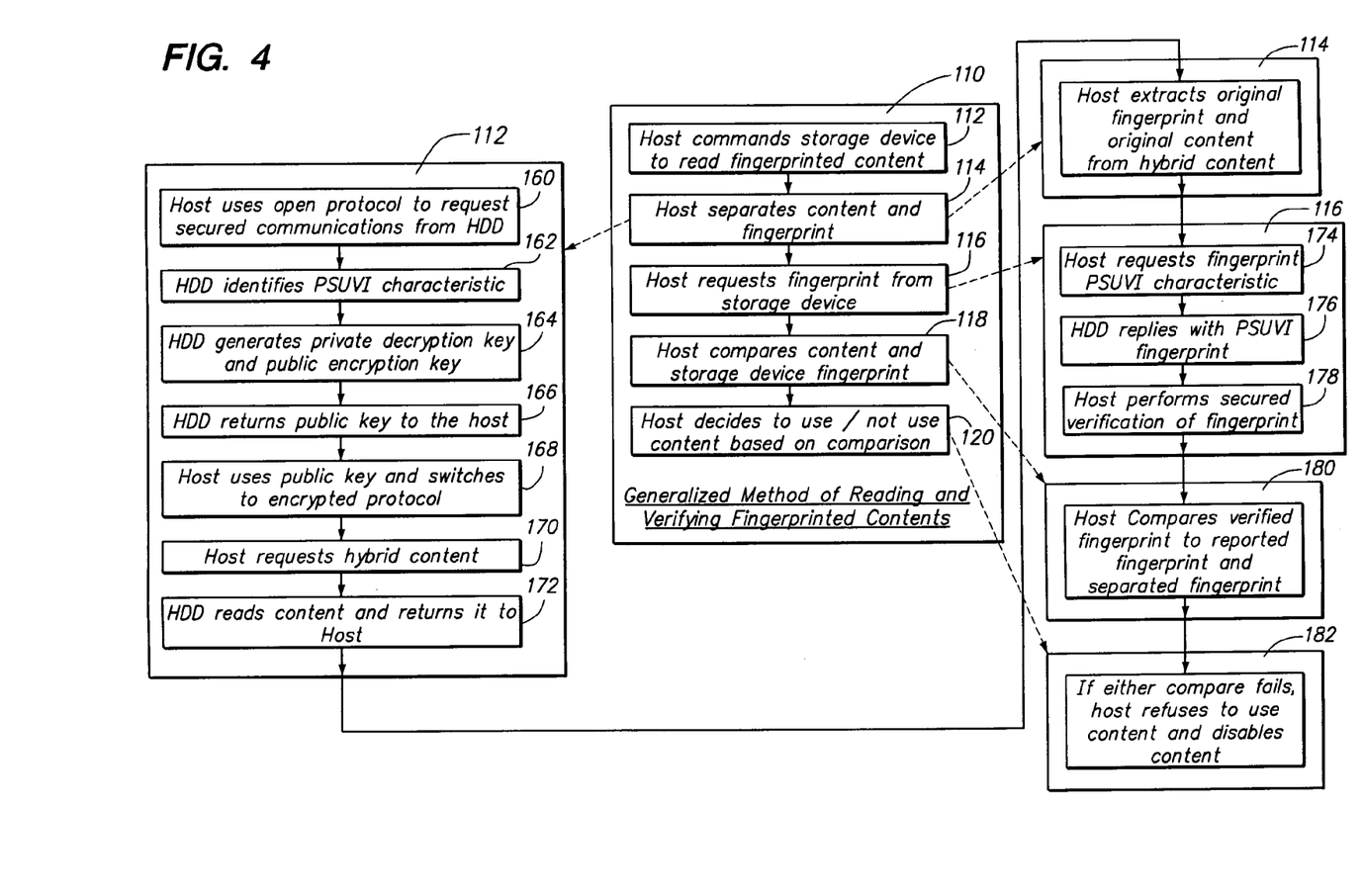
FIG. 4 shows a more expanded flowchart of the steps of reading and verifying contents of FIG. 2B.

FIG. 4 illustrates in greater detail a generalized method 110 of reading and authenticating a source content method of FIG. 2B. In this example, generalized method 110 of reading and verifying fingerprinted content comprises a first step 112 of a host processor 16 commanding storage device 20 to read fingerprinted content. For convenience of illustration, we assume processor used in this example is host processor 16. However, it is envisioned that the processor or host referred to and used herein to implement method 110 of reading and verifying source content can be generally a processor in any host system coupled to a storage device 20. Method 110 further comprises step 114 wherein host processor 16 separates file contents to retrieve the fingerprint content. Subsequently, in step 116, host processor 16 requests current storage device 20 to provide fingerprint information. Host processor 16 then compares in step 118 fingerprint separated in step 114 with fingerprint retrieved in step 116 to verify fingerprints, and finally in step 120, host processor 16 then decides whether to use or not to use content based on the comparison step 118.

FIG. 4 further illustrates a sample detailed embodiment of steps described above for method 112 to read and verify fingerprinted contents.

1. Reading the defect list from the HDD 20 (steps 160 and 162).
2. Decrypting the encrypted content. Parsing the vector subparts from the contents (steps 164–170)
3. Reassembling the subparts into a P-list vector (step 172).

More implementation details for steps described in method 110 are also provided in FIG. 4 and are self-explanatory. Different possible embodiments of methods to verify authenticity of a copied file are envisioned and contemplated. The following described sample methods include using the defect list of a disk:

Signature Verification Method Example 1
1. Perform low-level writes and reads on some or all of the PBAs in the defect list to determine whether or not read errors occurred at the supposed defect locations. Special microcode may be used to enhance the security of this verification step and protect from unauthorized interferences, or "man-in-the-middle" attacks. Well-characterized security methods for providing secured communications and generating encryption keys from the HDD's unique signature, such as Diffie-Hellman, are well-documented in the security community and may be used herein.
2. Defects in the defect list do not necessarily have a probability of error equal to 1.0. Therefore the host would then determine that either a statistically large percentage of the P-list did point to defective PBAs and that the P-list was valid for the HDD, or that a statistically small percentage of the P-list pointed to defective PBAs and that the P-list was invalid for the HDD.
3. If the defect list was invalid, then the host would take steps to not use the HDD contents.
4. If the defect list was valid then the host would use the content.

Signature Verification Method Example 2
If a unique signature other than the defect list is to be used, then the verification method changes accordingly. As an example, if Servo Burst Correction Values (BCVs) were used, measurement with BCVs turned on and off could indicate the validity of the HDD's current BCV values and whether or not they were altered. The same secured communications and key generation steps could be used to protect this verification algorithm.

Any items added to, or substituted for, the defect list in the algorithm prior to encryption fall into two categories:

PSUVI Characteristics: Relatively Immutable Physical Attributes Linkable to A Specific Head-Disk Assembly (HDA) or PCB.

The signature attribute of this category is related to the statistically unique physical properties of the HDA or electronics. A defect list falls into this category. These physical properties cannot be changed by a reasonable level of attack and can be measured by the drive. Servo wedge defects, BCV-related RRO responses, certain TMR behaviors, servo transfer functions and read or write channel optimization parameters related to individual heads also fall into this category. Any item in this category could substitute for the "defect list" above and satisfy the intent of this disclosure. The benefit of using a defect list based HDD differentiation is the low probability of any two HDDs having the same defect list and also that this list is physically verifiable, so that a change in the defect list is detectable.

Non-PSUVI Characteristics: Relatively Mutable Attributes Physically linked to a Specific Head-Disk Assembly (HDA) or PCB.

Serial numbers on configuration pages, post-production defect list ("G-lists") and PROM contents fall into this category of non-PSUVI characteristics. These items are not statistically unique physical properties of the HDA or electronics, and they may be changed by an attacker with no secure method of verification. These attributes can be used, but typically require lengthening the encoded vector to statistically increase the time required for an attacker to break the encryption.

Key advantages of this invention are that no added hardware is necessary. This invention can be implemented using preexisting hardware, and can be implemented on existing hosts and HDDs. This invention deters against minimally to significantly funded unauthorized breaches or accesses of a secured content. Hosts, or local processors on hosts, can be responsible for security methods, rather than the drive. Moreover, this invention can be implemented with existing security methods.

The parts of this system that may require restricted access comprise the encryption/decryption keys and verification algorithms. Methods for encryption and access restriction are well documented in the security community. The specific algorithms for encryption/decryption such as DES, or key generation algorithms such as Diffie-Hellman, are well-characterized and documented in the security community.

Foregoing described embodiments of the invention are provided as illustrations and descriptions. They are not intended to limit the invention to the precise form described. In particular, it is contemplated that functional implementation of the invention described herein may be implemented equivalently in hardware, software, firmware, and/or other available functional components or building blocks. Other variations and embodiments are possible in light of the above teachings, and it is thus intended that the scope of the invention not be limited by this Detailed Description, but rather by claims following.

What is claimed is:

1. An extremely secure method for a host processor to key a source content to a source storage medium to prevent use of an unauthorized copy of the source content comprising the host processor storing a fingerprinted content comprising the steps of:

the host processor determining a source fingerprint from the source storage medium, wherein the source fingerprint is a physical attribute of the source storage medium;

the host processor combining the source content to be secured with the source fingerprint to generate the fingerprinted content;

the host processor instructing the source storage medium to store the fingerprinted content; and the host processor reading and verifying the fingerprinted content, including:

the host processor instructing a local storage medium to read the fingerprinted content;

the host processor separating the source content to be secured from the source fingerprint;

the host processor requesting a local fingerprint from the local storage medium; and the host processor comparing the local fingerprint with the source fingerprint and in response to the comparison determining whether to use the source content.

2. The extremely secure method of claim 1 wherein the step of the host processor determining a source fingerprint further comprises:

the host processor using an open protocol to request a secured communication from the source storage medium;

the host processor identifying a physical, statistically unique, verifiable and relatively immutable (PSUVI) characteristic associated with the source storage medium;

generating encryption and/or decryption keys;

returning the encryption key to the host processor;

the host processor using the encryption key to convert the source content to an encrypted protocol;

the host processor requesting from the source storage medium the PSUVI characteristic; and the source storage medium responding to the host processor with the PSUVI characteristic.

3. The extremely secure method of claim 1 wherein the step of the host processor combining the source content with the source fingerprint to generate the fingerprinted content further comprises:

the host processor creating a hybrid content to be secured by combining the source content to be secured and the source fingerprint; and the host processor encrypting the fingerprinted content with an encryption key.

4. The extremely secure method of claim 1 wherein the step of the host processor requesting a local fingerprint from the local storage medium further comprises the steps of:

the host processor requesting from the local storage medium a local PSUVI characteristic;

the local storage medium replying to the host processor with the local PSUVI characteristic; and the host processor performing a secured verification of the local PSUVI characteristic.

5. The extremely secure method of claim 1 wherein the step of the host processor determining a source fingerprint further comprises:

the host processor using an open protocol to request a secured communication from the source storage medium;

the host processor identifying a relatively mutable physical attribute (Non-PSUVI) characteristic associated with the source storage medium;

generating encryption and/or decryption keys;

returning the encryption key to the host processor;

the host processor using the encryption key to convert the source content to an encrypted protocol;

the host processor requesting from the source storage medium the non-PSUVI characteristic; and the source storage medium responding to the host processor with the non-PSUVI characteristic.

6. The extremely secure method of claim 1 wherein the step of the host processor requesting a local fingerprint from the local storage medium further comprises the steps of:

the host processor requesting from the local storage medium a local non-PSUVI characteristic;

the local storage medium replying to the host processor with the local non-PSUVI characteristic; and the host processor performing a secured verification of the local non-PSUVI characteristic.

7. A method of securing source content from a hard disk drive, comprising:

providing a source content in a host processor;

providing a source fingerprint of a hard disk drive, wherein the source fingerprint is a physical attribute of the hard disk drive;

transferring the source fingerprint from the hard disk drive to the host processor; then generating a fingerprinted source content in the host processor using the source content and the source fingerprint, wherein the fingerprinted source content represents the source content and the source fingerprint; then transferring the fingerprinted source content from the host processor to the hard disk drive;

storing the fingerprinted source content in the hard disk drive; then retransferring the fingerprinted source content from the hard disk drive to the host processor;

generating the source content and the source fingerprint from the retransferred fingerprinted source content in the host processor;

retransferring the source fingerprint from the hard disk drive to the host processor; and then comparing the generated source fingerprint with the retransferred source fingerprint in the host processor, wherein the host processor determines whether the generated source content is sanctioned in response to the comparison.

8. The method of claim 7, wherein the source fingerprint is a statistically unique physical attribute of the hard disk drive.

9. The method of claim 8, wherein the source fingerprint is a relatively immutable physical attribute of the hard disk drive.

10. The method of claim 9, wherein the source fingerprint is a statistically unique, immutable and verifiable physical attribute of the hard disk drive.

11. The method of claim 7, wherein the source fingerprint is a defect list of the hard disk drive.

12. The method of claim 11, wherein the defect list includes physical block addresses.

13. The method of claim 7, wherein the source fingerprint is a servo characteristic of the hard disk drive.

14. The method of claim 13, wherein the servo characteristic is servo burst correction values.

15. The method of claim 13, wherein the servo characteristic is servo burst correction value related repeatable runout response.

16. The method of claim 13, wherein the servo characteristic is servo wedge defects.

17. The method of claim 13, wherein the servo characteristic is a servo transfer function.

18. The method of claim 7, wherein the source fingerprint is a track misregistration behavior of the hard disk drive.

19. The method of claim 7, wherein the source fingerprint is a channel optimization of the hard disk drive.

20. The method of claim 19, wherein the channel optimization is a read channel optimization parameter related to an individual head.

21. The method of claim 19, wherein the channel optimization is a write channel optimization parameter related to an individual head.

22. The method of claim 7, wherein the source fingerprint is a statistically unique physical property of a head disk assembly of the hard disk drive.

23. The method of claim 7, wherein the source fingerprint is a statistically unique physical property of a printed circuit board of the hard disk drive.

24. The method of claim 7, wherein the source fingerprint is magnetic defects of the hard disk drive.

25. The method of claim 7, wherein the source fingerprint is a head/media characteristic of the hard disk drive.

26. The method of claim 7, including transferring an encryption key from the hard disk drive to the host processor.

27. The method of claim 26, wherein generating the fingerprinted source content includes generating an encrypted source content using the source content and the encryption key in the host processor, and then generating the fingerprinted source content using the encrypted source content and the source fingerprint in the host processor.

28. The method of claim 26, wherein generating the fingerprinted source content includes generating a non-encrypted fingerprinted source content using the source content and the source fingerprint in the host processor, and then generating an encrypted fingerprinted source content using the non-encrypted fingerprinted source content and the encryption key.

29. The method of claim 7, wherein generating the fingerprinted source content includes encrypting the source content and the source fingerprint using an encryption algorithm.

30. The method of claim 7, wherein generating the source content includes decrypting the fingerprinted source content using a decryption algorithm.

31. The method of claim 7, wherein comparing the generated source fingerprint with the retransferred source fingerprint includes determining whether the generated source fingerprint and the retransferred source fingerprint match using statistical analysis.

32. The method of claim 31, wherein the statistical analysis includes determining whether a statistically large percentage of defects listed in the generated source fingerprint point to defects in the retransferred source fingerprint.

33. The method of claim 31, wherein the statistical analysis includes determining whether a statistically small percentage of defects listed in the generated source fingerprint point to defects in the retransferred source fingerprint.

34. The method of claim 7, wherein the generated source content is enabled for use by the host processor if the generated source fingerprint matches the retransferred source fingerprint, and the generated source content is disabled for use by the host processor if the generated source fingerprint does not match the retransferred source fingerprint.

35. The method of claim 7, wherein the host processor uses the generated source content if the generated source fingerprint matches the retransferred source fingerprint, and the host processor does not use the generated source content if the generated source fingerprint does not match the retransferred source fingerprint.

36. A method of securing source content from a hard disk drive, comprising:
  providing a source content in a host processor;
  providing a source fingerprint of a hard disk drive, wherein the source fingerprint is a physical, statistically unique, verifiable and relatively immutable (PSUVI) characteristic of the hard disk drive;
  transferring the source fingerprint from the hard disk drive to the host processor; then
  generating a fingerprinted source content in the host processor using the source content and the source fingerprint, wherein the fingerprinted source content represents the source content and the source fingerprint; then
  transferring the fingerprinted source content from the host processor to the hard disk drive;
  storing the fingerprinted source content in the hard disk drive; then
  retransferring the fingerprinted source content from the hard disk drive to the host processor;
  generating the source content and the source fingerprint from the retransferred fingerprinted source content in the host processor;
  retransferring the source fingerprint from the hard disk drive to the host processor; and then
  comparing the generated source fingerprint with the retransferred source fingerprint in the host processor, wherein the host processor determines whether the generated source content is sanctioned in response to the comparison.

37. The method of claim 36, wherein the source fingerprint is an immutable characteristic of the hard disk drive.

38. The method of claim 36, wherein the source fingerprint is a defect list.

39. The method of claim 36, including transferring an encryption key from the hard disk drive to the host processor.

40. The method of claim 39, wherein generating the fingerprinted source content includes generating an encrypted source content using the source content and the encryption key in the host processor, and then generating the fingerprinted source content using the encrypted source content and the source fingerprint in the host processor.

41. The method of claim 39, wherein generating the fingerprinted source content includes generating a non-encrypted fingerprinted source content using the source content and the source fingerprint in the host processor, and then generating an encrypted fingerprinted source content using the non-encrypted fingerprinted source content and the encryption key.

42. The method of claim 36, wherein generating the fingerprinted source content includes encrypting the source content and the source fingerprint using an encryption algorithm.

43. The method of claim 36, wherein generating the source content includes decrypting the fingerprinted source content using a decryption algorithm.

44. The method of claim 36, wherein the generated source content is enabled for use by the host processor if the generated source fingerprint matches the retransferred source fingerprint, and the generated source content is disabled for use by the host processor if the generated source fingerprint does not match the retransferred source fingerprint.

45. The method of claim 36, wherein the host processor uses the generated source content if the generated source fingerprint matches the retransferred source fingerprint, and the host processor does not use the generated source content if the generated source fingerprint does not match the retransferred source fingerprint.

46. A method of securing source content from a hard disk drive, comprising:
  providing a source content in a host processor;
  providing a media defect list of the hard disk drive;
  transferring the media defect list from the hard disk drive to the host processor; then
  generating a fingerprinted source content in the host processor using the source content and the media defect list, wherein the fingerprinted source content represents the source content and the source fingerprint; then
  transferring the fingerprinted source content from the host processor to the hard disk drive;
  storing the fingerprinted source content in the hard disk drive; then
  retransferring the fingerprinted source content from the hard disk drive to the host processor;
  generating the source content and the media defect list from the retransferred fingerprinted source content in the host processor;
  retransferring the media defect list from the hard disk drive to the host processor; and then
  comparing the generated media defect list with the retransferred media defect list in the host processor, wherein the host processor determines whether the generated source content is sanctioned in response to the comparison.

47. The method of claim 46, wherein the media defect list is a statistically unique, immutable and verifiable physical attribute of the hard disk drive.

48. The method of claim 46, wherein the media defect list includes physical block addresses.

49. The method of claim 46, including transferring an encryption key from the hard disk drive to the host processor.

50. The method of claim 49, wherein generating the fingerprinted source content includes generating an encrypted source content using the source content and the encryption key in the host processor, and then generating the fingerprinted source content using the encrypted source content and the media defect list in the host processor.

51. The method of claim 49, wherein generating the fingerprinted source content includes generating a non-encrypted fingerprinted source content using the source content and the media defect list in the host processor, and then generating an encrypted fingerprinted source content using the non-encrypted fingerprinted source content and the encryption key.

52. The method of claim 46, wherein generating the fingerprinted source content includes encrypting the source content and the media defect list using an encryption algorithm.

53. The method of claim 46, wherein generating the source content includes decrypting the fingerprinted source content using a decryption algorithm.

54. The method of claim 46, wherein the generated source content is enabled for use by the host processor if the generated media defect list matches the retransferred media defect list, and the generated source content is disabled for use by the host processor if the generated media defect list does not match the retransferred media defect list.

55. The method of claim 46, wherein the host processor uses the generated source content if the generated media defect list matches the retransferred media defect list, and the host processor does not use the generated source content if the generated media defect list does not match the retransferred media defect list.

56. A method of securing source content from a hard disk drive, comprising:
provide a source content in a host processor;
providing a first source fingerprint of a first hard disk drive, wherein the first source fingerprint is a physical, statistically unique, verifiable and relatively immutable (PSUVI) characteristic of the first hard disk drive;
providing a second source fingerprint of a second hard disk drive, wherein the second source fingerprint is a physical, statistically unique, verifiable and relatively immutable (PSUVI) characteristic of the second hard disk drive;
transferring the first source fingerprint from the first hard disk drive to the host processor;
generating a fingerprinted source content in the host processor using the source content and the first source fingerprint, wherein the fingerprinted source content represents the source content and the first source fingerprint; then
transferring the fingerprinted source content from the host processor to a selected hard disk drive;
storing the fingerprinted source content in the selected hard disk drive; then
retransferring the fingerprinted source content from the selected hard disk drive to a host device;
generating the source content and the first source fingerprint from the retransferred fingerprinted source content in the host device;
transferring a selected source fingerprint from the selected hard disk drive to the host device, wherein the selected source fingerprint is the first source fingerprint if the selected hard disk drive is the first hard disk drive, and the selected source fingerprint is the second source fingerprint if the selected hard disk drive is the second hard disk drive; and then
comparing the generated source fingerprint with the selected source fingerprint in the host device, wherein the host device determines that the generated source content is sanctioned if the generated source fingerprint matches the selected source fingerprint, and the host device determines that the generated source content is unsanctioned if the generated source fingerprint does not match the selected source fingerprint.

57. The method of claim 56, wherein the first source fingerprint is an immutable characteristic of the first hard disk drive, and the second source fingerprint is an immutable characteristic of the second hard disk drive.

58. The method of claim 56, wherein the first source fingerprint is a first defect list of the first hard disk drive, and the second source fingerprint is a second defect list of the second hard disk drive.

59. The method of claim 58, wherein the first defect list includes first physical block addresses, and the second defect list includes second physical block addresses.

60. The method of claim 56, wherein the first source fingerprint is a first servo characteristic of the first hard disk drive, and the second source fingerprint is a second servo characteristic of the second hard disk drive.

61. The method of claim 60, wherein the first servo characteristic is first servo burst correction values, and the second servo characteristic is second servo burst correction values.

62. The method of claim 60, wherein the first servo characteristic is first servo burst correction value related repeatable runout response, and the second servo characteristic is second servo burst correction value related repeatable runout response.

63. The method of claim 60, wherein the first servo characteristic is first servo wedge defects, and the second servo characteristic is second servo wedge defects.

64. The method of claim 60, wherein the first servo characteristic is a first servo transfer function, and the second servo characteristic is a second servo transfer function.

65. The method of claim 56, wherein the first source fingerprint is a track misregistration behavior of the first hard disk drive, and the second source fingerprint is a track misregistration behavior of the second hard disk drive.

66. The method of claim 56, wherein the first source fingerprint is a first channel optimization of the first hard disk drive, and the second source fingerprint is a second channel optimization of the second hard disk drive.

67. The method of claim 66, wherein the first channel optimization is a read channel optimization parameter related to a first individual head, and the second channel optimization is a read channel optimization parameter related to a second individual head.

68. The method of claim 66, wherein the first channel optimization is a write channel optimization parameter related to a first individual head, and the second channel optimization is a write channel optimization parameter related to a second individual head.

69. The method of claim 56, wherein the first source fingerprint is a statistically unique physical property of a head disk assembly of the first hard disk drive, and the second source fingerprint is a statistically unique physical property of a head disk assembly of the second hard disk drive.

70. The method of claim 56, wherein the first source fingerprint is a statistically unique physical property of a printed circuit board of the first hard disk drive, and the second source fingerprint is a statistically unique physical property of a printed circuit board of the second hard disk drive.

71. The method of claim 56, wherein the first source fingerprint is magnetic defects of the first hard disk drive, and the second source fingerprint is magnetic defects of the second hard disk drive.

72. The method of claim 56, wherein the first source fingerprint is a head/media characteristic of the first hard disk drive, and the second source fingerprint is a head/media characteristic of the second hard disk drive.

73. The method of claim 56, including transferring an encryption key from the first hard disk drive to the host processor.

74. The method of claim 73, wherein generating the fingerprinted source content includes generating an encrypted source content using the source content and the encryption key in the host processor, and then generating the fingerprinted source content using the encrypted source content and the first source fingerprint in the host processor.

75. The method of claim 73, wherein generating the fingerprinted source content includes generating a non-encrypted fingerprinted source content using the source content and the first source fingerprint in the host processor, and then generating an encrypted fingerprinted source content using the non-encrypted fingerprinted source content and the encryption key.

76. The method of claim 56, wherein generating the fingerprinted source content includes encrypting the source content and the first source fingerprint using an encryption algorithm.

77. The method of claim 56, wherein generating the source content includes decrypting the fingerprinted source content using a decryption algorithm.

78. The method of claim 56, wherein the selected hard disk drive is the first hard disk drive, the selected source fingerprint is the first source fingerprint, and the host device determines that the generated source content is sanctioned.

79. The method of claim 78, wherein the host device is the host processor.

80. The method of claim 56, wherein the selected hard disk drive is the second hard disk drive, the selected source fingerprint is the second source fingerprint, and the host device determines that the generated source content is unsanctioned.

81. The method of claim 80, wherein the host device is another processor.

82. The method of claim 80, wherein transferring the fingerprinted source content from the host processor to the second hard disk drive includes transferring the fingerprinted source content from the host processor to the first hard disk drive, and then transferring the fingerprinted source content from the first hard disk drive to the second hard disk drive.

83. The method of claim 82, wherein transferring the fingerprinted source content from the first hard disk drive to the second hard disk drive includes transferring a drive image copy of the fingerprinted source content from the first hard disk drive to the second hard disk drive.

84. The method of claim 82, wherein transferring the fingerprinted source content from the first hard disk drive to the second hard disk drive is performed using low-level block copy software.

85. The method of claim 82, wherein the host device is another processor.

86. The method of claim 56, wherein the host device is the host processor.

87. The method of claim 56, wherein the host device is another processor.

88. The method of claim 56, wherein comparing the generated source fingerprint with the selected source fingerprint includes determining whether the generated source fingerprint and the selected source fingerprint match using statistical analysis.

89. The method of claim 88, wherein the statistical analysis includes determining whether a statistically large percentage of items listed in the generated source fingerprint are consistent with the selected source fingerprint.

90. The method of claim 88, wherein the statistical analysis includes determining whether a statistically small percentage of items listed in the generated source fingerprint are inconsistent with the selected source fingerprint.

91. The method of claim 88, wherein the statistical analysis includes determining whether a statistically large percentage of defects listed in the generated source fingerprint point to defects in the selected source fingerprint.

92. The method of claim 88, wherein the statistical analysis includes determining whether a statistically small percentage of defects listed in the generated source fingerprint point to defects in the selected source fingerprint.

93. The method of claim 56, wherein the generated source content is enabled for use by the host device if the generated source fingerprint matches the selected source fingerprint, and the generated source content is disabled for use by the host device if the generated source fingerprint does not match the selected source fingerprint.

94. The method of claim 56, wherein the host device uses the generated source content if the generated source fingerprint matches the selected source fingerprint, and the host device does not use the generated source content if the generated source fingerprint does not match the selected source fingerprint.

95. The method of claim 56, wherein the host device determines that the generated source content is an authorized copy of the source content if the generated source fingerprint matches the selected source fingerprint, and the host device determines that the generated source content is an unauthorized copy of the source content if the generated source fingerprint does not match the selected source fingerprint.

* * * * *